US011435079B2

(12) United States Patent
Duong

(10) Patent No.: US 11,435,079 B2
(45) Date of Patent: Sep. 6, 2022

(54) DIFFUSER PIPE WITH AXIALLY-DIRECTED EXIT

(71) Applicant: PRATT & WHITNEY CANADA CORP., Longueuil (CA)

(72) Inventor: Hien Duong, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 91 days.

(21) Appl. No.: 16/440,213

(22) Filed: Jun. 13, 2019

(65) Prior Publication Data
US 2020/0393129 A1 Dec. 17, 2020

(51) Int. Cl.
| F02C 3/08 | (2006.01) |
| F01D 9/02 | (2006.01) |
| F04D 29/44 | (2006.01) |
| F04D 29/54 | (2006.01) |
| F23R 3/04 | (2006.01) |
| F01D 17/14 | (2006.01) |
| F04D 29/22 | (2006.01) |

(52) U.S. Cl.
CPC ............. *F23R 3/045* (2013.01); *F01D 9/02* (2013.01); *F01D 17/14* (2013.01); *F02C 3/08* (2013.01); *F04D 29/2255* (2013.01); *F04D 29/441* (2013.01); *F04D 29/547* (2013.01); *F05D 2240/12* (2013.01); *F05D 2250/52* (2013.01); *F05D 2260/96* (2013.01)

(58) Field of Classification Search
CPC .......... F02C 3/08; F04D 29/44; F04D 29/441; F04D 29/2255; F04D 29/547; F01D 9/02; F01D 17/14; F23R 3/04; F23R 3/045; F23R 3/10; F23R 3/12; F23R 3/14
See application file for complete search history.

(56) References Cited

U.S. PATENT DOCUMENTS

| 3,019,606 | A | * | 2/1962 | Franz | F23R 3/04 |
| | | | | | 60/759 |
| 4,100,732 | A | * | 7/1978 | Bryans | F02C 3/08 |
| | | | | | 60/804 |
| 4,825,643 | A | * | 5/1989 | Hennecke | F02C 7/12 |
| | | | | | 60/806 |
| 4,989,807 | A | | 2/1991 | Foreman et al. | |
| 6,280,139 | B1 | * | 8/2001 | Romani | F04D 29/441 |
| | | | | | 415/207 |
| 6,488,469 | B1 | * | 12/2002 | Youssef | F04D 17/06 |
| | | | | | 415/143 |
| 9,631,814 | B1 | * | 4/2017 | Barton | F01D 9/041 |
| 9,926,942 | B2 | | 3/2018 | Doung et al. | |
| 2010/0031663 | A1 | * | 2/2010 | Commaret | F04D 29/444 |
| | | | | | 60/751 |

(Continued)

FOREIGN PATENT DOCUMENTS

FR          2922939          4/2014

*Primary Examiner* — Courtney D Heinle
*Assistant Examiner* — Michael K. Reitz
(74) *Attorney, Agent, or Firm* — Norton Rose Fulbright Canada

(57) ABSTRACT

A compressor diffuser for a gas turbine engine includes diffuser pipes having a tubular body including a generally radial portion, a bend portion and a generally axial portion. The generally axial portion has an exit segment extending parallel to the center axis and terminating at a pipe outlet. The bend portion is disposed radially further from the center axis than the exit segment.

14 Claims, 3 Drawing Sheets

(56) References Cited

U.S. PATENT DOCUMENTS

| | | | | |
|---|---|---|---|---|
| 2014/0271173 A1* | 9/2014 | Bryan | ............... | F04D 29/30 |
| | | | | 415/211.2 |
| 2015/0226232 A1* | 8/2015 | Duong | ............... | F04D 29/684 |
| | | | | 415/1 |
| 2019/0162197 A1* | 5/2019 | Hoover | ............... | F02C 3/08 |
| 2019/0293087 A1* | 9/2019 | Tamada | ............... | F04D 29/441 |

* cited by examiner

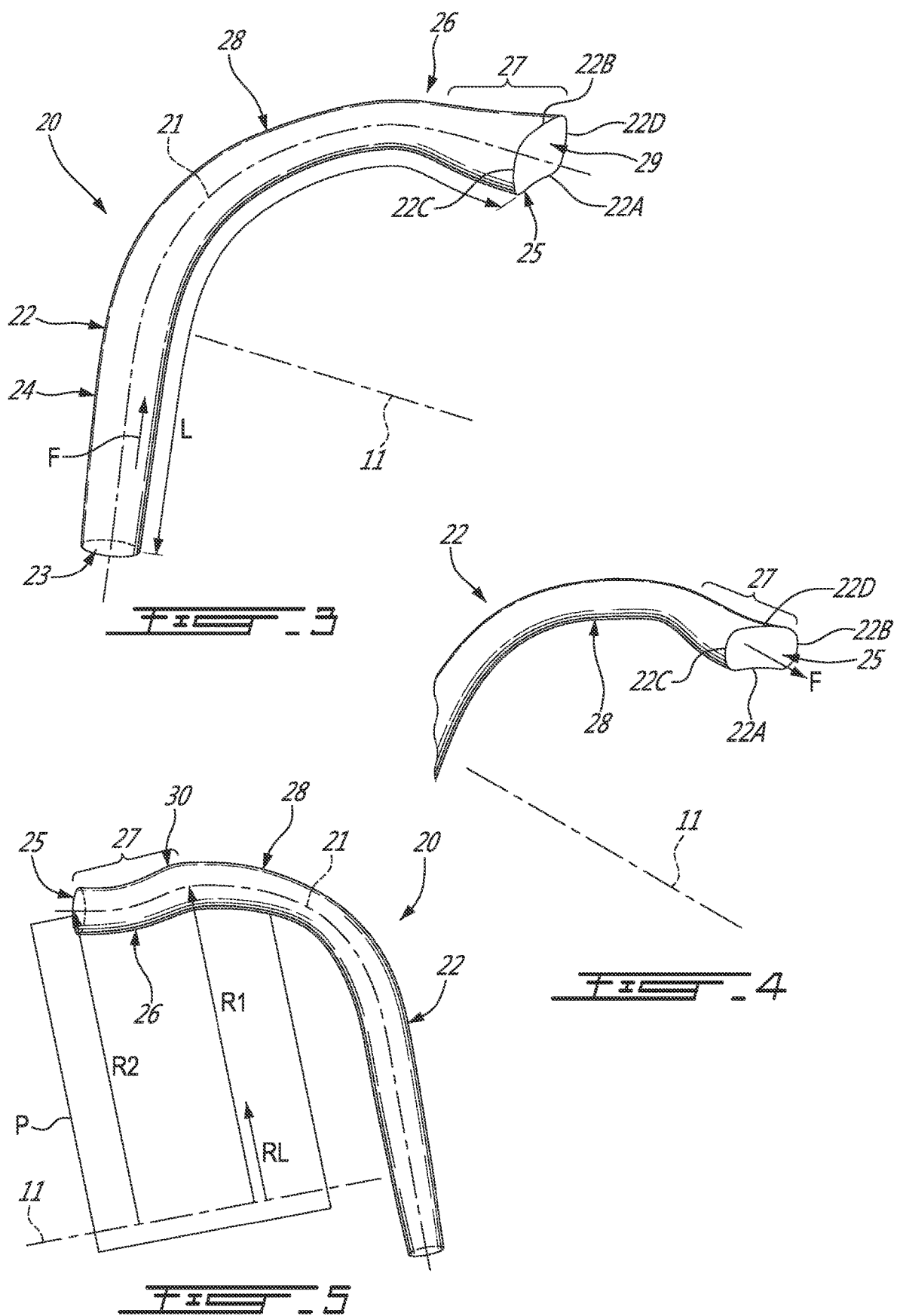

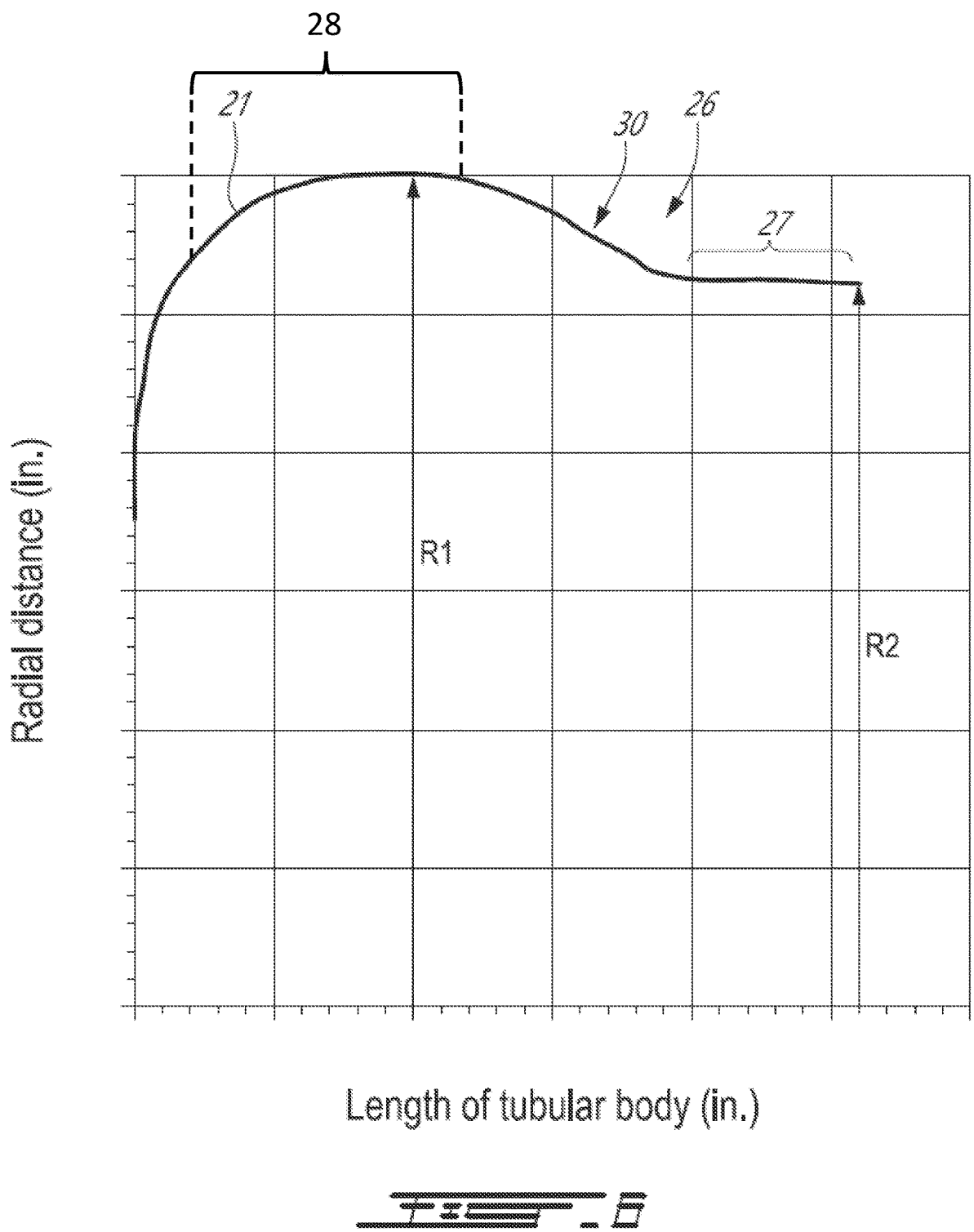

US 11,435,079 B2

DIFFUSER PIPE WITH AXIALLY-DIRECTED EXIT

TECHNICAL FIELD

The present invention relates generally to centrifugal compressors for gas turbine engines, and more particularly to diffuser pipes for such centrifugal compressors.

BACKGROUND

Diffuser pipes are provided in certain gas turbine engines for diffusing a flow of high speed air received from an impeller of a centrifugal compressor and directing the flow to a downstream component, such as an annular chamber containing the combustor. The diffuser pipes are typically circumferentially arranged at a periphery of the impeller, and are designed to transform kinetic energy of the flow into pressure energy. Diffuser pipes seek to provide a uniform exit flow with minimal distortion, as it is preferable for flame stability, low combustor loss, reduced hot spots etc. Vibrations and other loads to which the diffuser pipes are exposed in operation can cause undesirable damage thereto (e.g. cracks in the diffuser).

Where space allows, diffuser pipe length is commonly maximized for performance and sometimes range. However, longer diffuser pipes may be exposed to high bending stress due to long pipe flapping motion, which may, under some circumstances, lead to cracking in the diffuser pipes. Reducing the length of diffuser pipes may avoid or reduce pipe flapping, but may adversely affect pipe performance.

SUMMARY

There is provided a compressor diffuser for a gas turbine engine having a center axis, the compressor diffuser comprising: diffuser pipes having a tubular body including a generally radial portion, a bend portion and a generally axial portion, the generally axial portion having an exit segment extending parallel to the center axis and terminating at a pipe outlet, the bend portion disposed radially further from the center axis than the exit segment.

There is provided a gas turbine engine, comprising: a compressor having an impeller rotatable about a center axis, and having a radial impeller outlet; a diffuser with diffuser pipes to receive fluid from the radial impeller outlet, and having a tubular body including a generally radial portion, a bend portion and a generally axial portion, the generally axial portion having an exit segment extending parallel to the center axis and terminating at a pipe outlet, the bend portion disposed radially further from the center axis than the exit segment; and a reverse-flow combustor downstream of the diffuser.

There is provided a method of modifying a vibratory response of a diffuser pipe of a compressor with a center axis, the method comprising: positioning a bend portion of the diffuser pipe radially outwardly from the center axis and from an outlet of the diffuser pipe, and orienting an exit segment of the diffuser pipe to be parallel with the center axis.

BRIEF DESCRIPTION OF THE DRAWINGS

Reference is now made to the accompanying figures in which:

FIG. 3 is a perspective view of one of the diffuser pipes of FIG. 2;

FIG. 4 is another perspective view of one of the diffuser pipes of FIG. 2;

FIG. 5 is another perspective view of one of the diffuser pipes of FIG. 2; and

FIG. 6 is graph plotting radial distance of one of the diffuser pipes of FIG. 2 along a length of said diffuser pipe.

DETAILED DESCRIPTION

Figure 1:
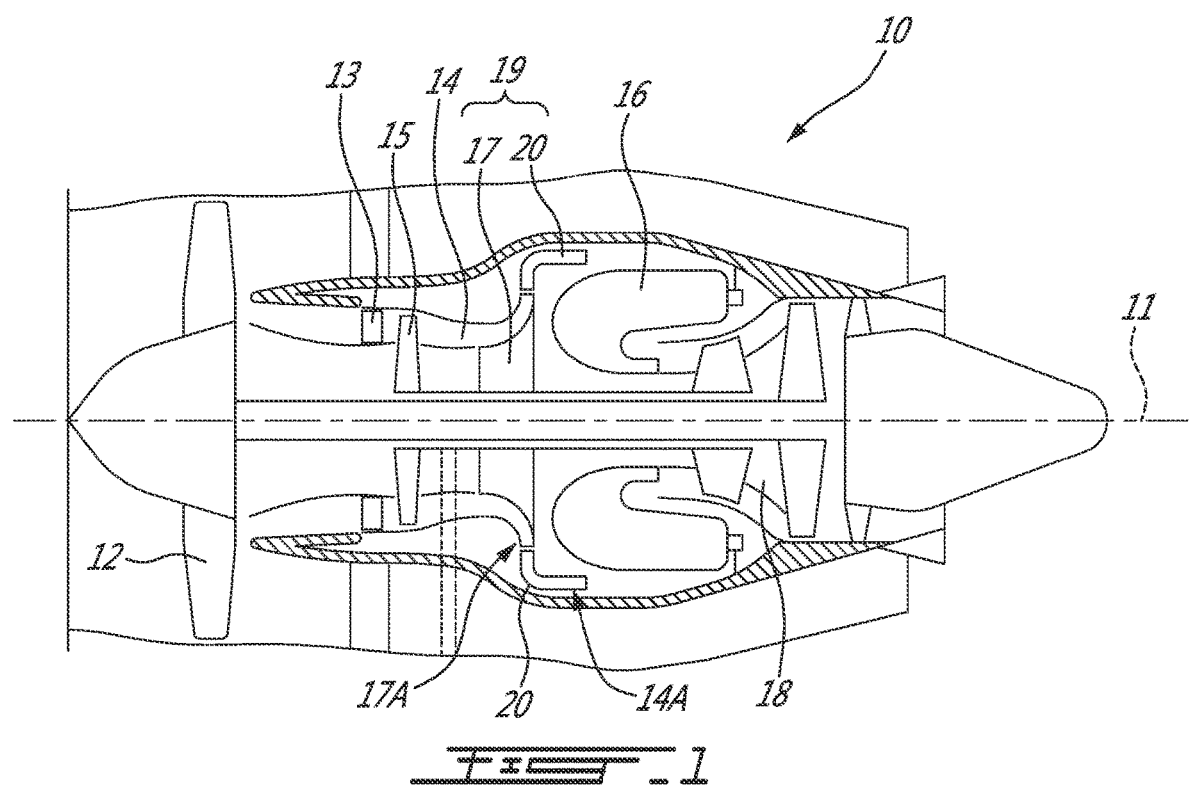
FIG. 1 is a schematic cross-sectional view of a gas turbine engine.

FIG. 1 illustrates a gas turbine engine 10 of a type preferably provided for use in subsonic flight, generally comprising in serial flow communication along an engine center axis 11 a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include a plurality of stators 13 and rotors 15 (only one stator 13 and rotor 15 being shown in FIG. 1), and it may include a centrifugal compressor 19.

The centrifugal compressor 19 of the compressor section 14 includes an impeller 17 with vanes and a compressor diffuser 14A. The compressor diffuser 14A includes a plurality of diffuser pipes 20, which are located downstream of the impeller 17 and circumferentially disposed about a periphery of a radial outlet 17A of the impeller 17. The diffuser pipes 20 convert high kinetic energy at the impeller 17 exit to static pressure by slowing down fluid flow exiting the impeller. The diffuser pipes 20 also redirect the air flow from a radial orientation to an axial orientation (i.e. aligned with the engine axis 11). In most cases, the Mach number of the flow entering the diffuser pipe 20 may be at or near sonic, while the Mach number exiting the diffuser pipe 20 may be less than 0.25 to enable stable air/fuel mixing, and light/relight in the combustor 16.

Figure 2:
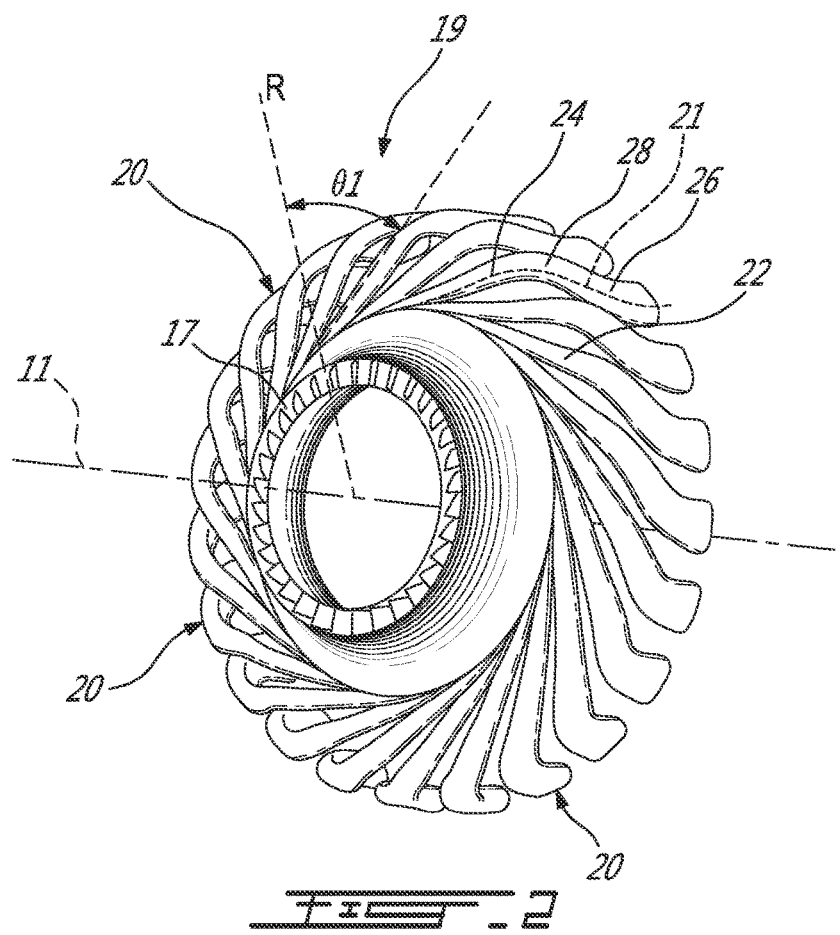
FIG. 2 is a perspective view of an impeller and diffuser pipes of a centrifugal compressor of the gas turbine of FIG. 1.

FIG. 2 shows the impeller 17 and the plurality of diffuser pipes 20, also referred to as "fishtail diffuser pipes", of the centrifugal compressor 19. Each of the diffuser pipes 20 includes a diverging (in a downstream direction) tubular body 22, formed, in one embodiment, of sheet metal. The enclosed tubular body 22 defines a flow passage 29 (see FIG. 3) extending the length of the diffuser pipe 20 through which the compressed fluid flow is conveyed. The tubular body 22 includes a first portion 24 extending generally tangentially from the periphery and radial outlet 17A of the impeller 17. An open end is provided at an upstream end of the tubular body 22 and forms an inlet 23 (see FIG. 3) of the diffuser pipe 20. The first portion 24 is inclined at an angle 81 relative to a radial axis R extending from the engine axis 11. The angle 81 may be at least partially tangential, or even substantially tangentially, and may further correspond to a direction of fluid flow at the exit of the blades of the impeller 17, such as to facilitate transition of the flow from the impeller 17 to the diffuser pipes 20. The first portion 24 of the tubular body 22 can alternatively extend more substantially along the radial axis R, and is sometimes referred to herein as a generally radial portion 24.

The tubular body 22 of the diffuser pipes 20 also includes a second portion 26, which is disposed generally axially and is sometimes referred to herein as a generally axial portion 26. The generally axial portion 26 is connected to the first portion 24 by an out-of-plane curved or bend portion 28, sometimes referred to as the "elbow" of the diffuser pipe 20. An open end at the downstream end of the second portion 26 forms a pipe outlet 25 (see FIG. 3) of the diffuser pipe 20. Preferably, but not necessarily, the first portion 24 and the second portion 26 of the diffuser pipes 20 are integrally formed together and extend substantially uninterrupted between each other, via the curved, bend portion 28.

The large radial velocity component of the flow exiting the impeller 17, and therefore entering the first portion 24 of each of the diffuser pipes 20, may be removed by shaping the diffuser pipe 20 with the bend portion 28, such that the flow is redirected axially through the second portion 26 before exiting via the pipe outlet 25 to the combustor 16. In the depicted embodiment, and as shown in FIG. 1, the combustor 16 is a reverse-flow combustor 16 positioned to receive fluid flow from the pipe outlet 25. It will thus be appreciated that the flow exiting the impeller 17 enters the inlet 23 and the upstream first portion 24 and flows along a generally radial first direction. At the outlet of the first portion 24, the flow enters the bend portion 28 which functions to turn the flow from a substantially radial direction to a substantially axial direction. The bend portion 28 may form a 90 degree bend. At the outlet of the bend portion 28, the flow enters the downstream second portion 26 and flows along a substantially axial second direction different from the generally radial first direction. By "generally radial", it is understood that the flow may have axial, radial, and/or circumferential velocity components, but that the axial and circumferential velocity components are much smaller in magnitude than the radial velocity component. Similarly, by "generally axial", it is understood that the flow may have axial, radial, and/or circumferential velocity components, but that the radial and circumferential velocity components are much smaller in magnitude than the axial velocity component.

Referring now to FIG. 3, the tubular body 22 of each diffuser pipe 20 has an exit segment 27. The exit segment 27 is a downstream portion of the tubular body 22 through which the flow is conveyed. In the depicted embodiment, the exit segment 27 extends over a portion of the length L of the tubular body 22, and is positioned downstream of the bend portion 28. The exit segment 27 begins at a location downstream of the bend portion 28 and terminates at the pipe outlet 25. The exit segment 27 includes and defines the pipe outlet 25. The exit segment 27 is disposed entirely within the second portion 26 of the tubular body 22 in the depicted embodiment and is a part thereof. The exit segment 27 is the last portion of the tubular body 22 through which the flow is conveyed. The length L of the tubular body 22 is defined from the inlet 23 to the pipe outlet 25. The exit segment 27 in an embodiment has a length equal to approximately 20% of the length L of the tubular body 22. Such a length for the exit segment 27 may be sufficient for the fluid flow F to settle down after the bend portion 28, and for any residual turbulence to mix out before exiting the diffuser pipe 20.

Referring to FIG. 3, the tubular body 22 of each diffuser pipe 20 has a radially inner wall 22A and a radially outer wall 22B. The tubular body 22 also has a first side wall 22C spaced circumferentially apart across the flow passage 29 from a second side wall 22D. The radially inner and outer walls 22A,22B and the first and second side walls 22C,22D meet and are connected to form the enclosed flow passage 29 extending through the length L of the tubular body 22. The radially inner wall 22A corresponds to the wall of the tubular body 22 that has the smallest turning radius at the bend portion 28, and the radially outer wall 22B corresponds to the wall of the tubular body 22 that has the largest turning radius at the bend portion 28.

The tubular body 22 diverges in the direction of fluid flow F therethrough, in that the internal flow passage 29 defined within the tubular body 22 increases in cross-sectional area along its length L which extends between the inlet 23 of the diffuser pipe 20 and the pipe outlet 25. This increase in cross-sectional area of the flow passage 29 through each diffuser pipe 20 may be continuous along the complete length L of the tubular body 22, or the cross-sectional area of the flow passage 29 may increase in gradual increments along the length L of the tubular body 22. In the depicted embodiment, the cross-sectional area of the flow passage 29 defined within the tubular body 22 increases gradually and continuously along its length L, from the inlet 23 to the pipe outlet 25. The pipe outlet 25 is circumscribed by a peripheral edge of the diffuser pipe 20 at its exit, where the peripheral edge is defined by the inner, outer, and side walls 22A,22B, 22C,22D. The direction of fluid flow F is generally along a pipe center axis 21 of the tubular body 22. The pipe center axis 21 extends through each of the first, second, and bend portions 24,26,28 and has the same orientation as these portions. The pipe center axis 21 is thus curved. In the depicted embodiment, the pipe center axis 21 is equidistantly spaced from the radially inner and outer walls 22A, 22B of the tubular body 22, and from the first and second side walls 22C,22D, along the length L of the tubular body 22.

Referring to FIG. 5, the exit of the diffuser pipe 20 has a lower radius than the radius of the diffuser pipe 20 in the bend portion 28. The bend portion 28 is disposed radially further from the center axis 11 than the exit segment 27. More particularly, a first radial distance R1 along the bend portion 28 is greater than a second radial distance R2 at the pipe outlet 25, where the first and second radial distances R1,R2 are measured from the center axis 11 of the gas turbine engine 10 (which, in the depicted embodiment, corresponds to the center axis of the impeller 17). The first and second radial distances R1,R2 may be measured to any suitable portion of the corresponding bend portion 28 and pipe outlet 25. For example, in the depicted embodiment, the first and second radial distances R1,R2 are measured from the center axis 11 to the pipe center axis 21 at the bend portion 28 and the pipe outlet 25. In another example, the first and second radial distances R1,R2 are measured from the center axis 11 to one of the inner, outer, or side walls 22A,22B,22C of the tubular body 22 at the bend portion 28 and the pipe outlet 25, provided that the first and second radial distances R1,R2 are defined with respect to the same wall 22A,22B,22C. In the depicted embodiment, the first radial distance R1 at any point along the bend portion 28 is greater than the second radial distance R2 at the pipe outlet 25. Thus the exit of the diffuser pipe 20 has a lower radius than the "highest" point of the diffuser pipe 20. The diffuser pipe 20 thus has an additional, radially-inward curve at its exit. This configuration of the bend portion 28 and the pipe outlet 25 provides the diffuser pipe 20 with an "S" or "gooseneck" shape, which may help stiffen the diffuser pipe 20 and raise its natural frequency, so that the "1E interference for bending mode" may be pushed out of the operating range of the diffuser pipe 20.

Referring to FIGS. 4 and 5, the exit segment 27 has an orientation that is substantially parallel to the center axis 11. By "parallel", it is understood that the exit segment 27 has a directional vector made up of an axial component parallel to the center axis 11. The axial component is much larger in magnitude than any other component the directional vector may have, such as a radial component being radial to the center axis 11, or a circumferential component being circumferential about the center axis 11. The exit segment 27 is thus able to discharge the fluid flow F axially, such that any radial or circumferential velocity components of the fluid flow F are much smaller in magnitude than the axial velocity component.

Lowering the exit radius of the diffuser pipe 20 at the pipe outlet 25 may have the effect of lengthening the tubular body 22 before the bend portion 28. Having a diffuser pipe 20 that is longer before the bend portion 28 may reduce the effect of pipe exit overhang and lower strain energy at the root of the diffuser pipe 20. Furthermore, an increase in pipe length before the bend portion 28 could be used to offset any required length reduction at the pipe exit in the second portion 26.

Referring to FIGS. 3 and 4, although having an orientation that is substantially parallel to the center axis 11, the exit segment 27 also has a circumferential twist when compared to a portion of the tubular body 22 immediately upstream of the exit segment 27. The flow path through the diffuser pipe 20 is twisted and changed to remove swirl in flow. As shown in FIGS. 3 and 4, the exit segment 27 turns circumferentially toward the engine center axis 11, when compared to more upstream segments of the second portion 26 of the tubular body 22, to convey flow from the outlet 25 along a substantially axial direction, and to help remove swirl from the flow.

Referring to FIG. 5, planes P intersect the tubular body 22 (only one being shown in FIG. 5 for clarity). Each plane P is defined by the center axis 11 of the engine 10 and/or the centrifugal compressor 19, and by radial lines RL extending from the center axis 11. More particularly, the center axis 11 and one of the radial lines RL will lie in, and thus define, one of the planes P. It will be appreciated that there may be a large number of planes P for a given tubular body 22. A profile of the tubular body 22 in a plane P (also referred to herein as a "planar profile") is defined where that plane P intersects the tubular body 22. The planar profiles are two-dimensional representations of the of the tubular body 22 in the intersecting plane P over at least part of the length L of the tubular body 22. FIG. 6 shows the planar profile of the tubular body 22 in one of the planes P that intersects the tubular body 22. FIG. 6 also shows a two-dimensional projection of the curved and twisting pipe center axis 21 onto the intersecting plane P. It will be appreciated that other features of the tubular body 22 (e.g. one of the walls 22A,22B,22C,22D) may also be projected onto the intersecting plane P.

The first radial distance R1, the second radial distance R2, and the axially-straightened exit segment 27 may be better understood by referring to FIG. 6. FIG. 6 plots the radial distance of the pipe center axis 21 in inches (the y-axis) measured from the center axis 11 of the engine 10 and/or the centrifugal compressor 19 at different points along the length L of the tubular body 22 (the x-axis). The y-axis in FIG. 6 corresponds to a radial orientation relative to the center axis 11, and the x-axis corresponds to an axial orientation. The first radial distance R1 along the bend portion 28 is greater than the second radial distance R2 at the pipe outlet 25. The first radial distance R1 at any point along the bend portion 28 is greater than the second radial distance R2 at the pipe outlet 25. In an embodiment, the second radial distance R2 is greater than 75% and less than 100% of the first radial distance R1. The exit segment 27 is a constant radial distance from the center axis 11. In FIG. 6, the constant radial distance is equal to the second radial distance R2. The exit segment 27 therefore forms a constant-radius extension of the diffuser pipe 20 at its exit. The exit radius of the diffuser pipe 20 in FIG. 6 is lower than a radius at the bend portion 28 and remains constant over some length. The exit segment 27 is the same radial distance R2 from the center axis 11 along the entire length of the exit segment 27.

Referring to FIGS. 5 and 6, the generally axial portion 26 curves radially inwardly from the bend portion 28 toward the exit segment 27. The tubular body 22 in FIGS. 5 and 6 has an intermediate portion 30 that extends between and fluidly connects the bend portion 28 and the exit segment 27. The intermediate portion 30 is part of the second portion 26 of the tubular body 22. The intermediate portion 30 (i.e. or some portion thereof such as a corresponding segment of the pipe center axis 21, the walls 22A,22B,22C, etc.) curves radially inwardly toward the center axis 11 from a downstream end of the bend portion 28 toward an upstream end of the exit segment 27. The diffuser pipe 20 thus bends radially inwardly at a location downstream of the main radial-to-axial bend portion 28, before flattening out at the exit segment 27. In contrast, some conventional diffuser pipes extend radially then axially, such that the radius at the exit is higher than at the bend, or may be the highest throughout the whole pipe.

Referring to FIG. 6, a slope of the planar profile is shown. In FIG. 6, the slope is the change in the radial distance of the pipe center axis 21 from the center axis 11 over a length along the center axis 11. A negative slope indicates that the radial distance of the pipe center axis 21 is decreasing over the length in question, while a positive slope indicates that the radial distance of the pipe center axis 21 is increasing over the length in question. A slope of the intermediate portion 30 in the plane shown in FIG. 6 is negative. The radial distance of the intermediate portion 30 from the center axis 11 decreases over its length. The radial distance of the intermediate portion 30 is highest at an upstream end thereof, and lowest at a downstream end of the intermediate portion 30. The slope of the exit segment 27 in the plane shown in FIG. 6 is zero, indicating that the radial distance of the exit segment 27 from the center axis 11 does not vary substantially over its length. The exit segment 27 is therefore flat in the plane shown in FIG. 6.

There is disclosed a method of modifying a vibratory response of the diffuser pipe 20. Referring to FIG. 3, the method includes positioning the bend portion 28 radially outwardly from the center axis 11 and from the outlet 25 of the diffuser pipe 20, and orienting the exit segment 27 to be parallel with the center axis 11. The method may include lengthening the diffuser pipe 20 before the bend portion 28, for example by lengthening the first portion 24 of the tubular body 22. An increase in pipe length before the bend may be used to offset any required length reduction at the pipe exit.

The diffuser pipes 20 disclosed herein may help to raise the natural frequency of the diffuser pipe 20 during operation of the centrifugal compressor 19 in order to move the natural frequency out of the range of the 1E interference for bending mode. This increase in natural frequency may be achieved by minimizing any reduction in the length of the diffuser pipe 20, and thus may minimize any changes in diffuser pipe performance.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A compressor diffuser for a gas turbine engine having a center axis, the compressor diffuser comprising: diffuser pipes having a tubular body including a generally radial portion, a bend portion and a generally axial portion, the generally axial portion having an exit segment extending parallel to the center axis and terminating at a pipe outlet, the pipe outlet being a downstream extremity of the compressor diffuser, the tubular body defining a pipe center axis extending from the radial portion to the pipe outlet, the pipe center axis through the exit segment being the same radial distance from the center axis along the exit segment, the pipe center axis through all of the bend portion disposed radially further from the center axis than the pipe center axis through all of the exit segment, the generally axial portion of the tubular body having an inner wall and an outer wall spaced radially outwardly from the inner wall, a length of the generally axial portion curving radially inwardly from the bend portion toward the exit segment, the inner wall and the outer wall both curving radially inwardly from the bend portion toward the exit segment over the length of the generally axial portion.

2. The compressor diffuser of claim 1, wherein the tubular body has a length measured from an inlet of the generally radial portion to the pipe outlet, the exit segment having a length of 20% of the length of the tubular body.

3. The compressor diffuser of claim 1, wherein the center axis and radial lines extending therefrom define a plurality of planes, one of the plurality of planes intersecting the tubular body along the generally axial portion to define a planar profile of the generally axial portion, the planar profile having a slope being a change in a radial distance of the planar profile from the center axis over a length along the center axis, the slope of the planar profile being negative where the generally axial portion curves radially inwardly from the bend portion toward the exit segment.

4. The compressor diffuser of claim 3, wherein the slope of planar profile along the exit segment is zero.

5. The compressor diffuser of claim 1, wherein the exit segment is curved circumferentially relative to a portion of the tubular body immediately upstream of the exit segment.

6. The compressor diffuser of claim 1 in combination with a reverse-flow combustor positioned to receive fluid flow from the pipe outlet.

7. A gas turbine engine, comprising:
a compressor having an impeller rotatable about a center axis, and having a radial impeller outlet;
a diffuser with diffuser pipes to receive fluid from the radial impeller outlet, and having a tubular body including a generally radial portion, a bend portion and a generally axial portion, the generally axial portion having an exit segment extending parallel to the center axis and terminating at a pipe outlet being a downstream extremity of the diffuser, the tubular body defining a pipe center axis extending from the radial portion to the pipe outlet, the pipe center axis through all of the bend portion disposed radially further from the center axis than the pipe center axis through all of the exit segment, the generally axial portion of the tubular body having an inner wall and an outer wall spaced radially outwardly from the inner wall, a length of the generally axial portion curving radially inwardly from the bend portion toward the exit segment, the inner wall and the outer wall both curving radially inwardly from the bend portion toward the exit segment over the length of the generally axial portion; and
a reverse-flow combustor downstream of the diffuser.

8. The gas turbine engine of claim 7, wherein the exit segment is the same radial distance from the center axis along a length of the exit segment.

9. The gas turbine engine of claim 7, wherein the tubular body has a length measured from an inlet of the generally radial portion to the pipe outlet, the exit segment having a length of 20% of the length of the tubular body.

10. The gas turbine engine of claim 7, wherein the center axis and radial lines extending therefrom define a plurality of planes, one of the plurality of planes intersecting the tubular body along the generally axial portion to define a planar profile of the generally axial portion, the planar profile having a slope being a change in a radial distance of the planar profile from the center axis over a length along the center axis, the slope of the planar profile being negative where the generally axial portion curves radially inwardly from the bend portion toward the exit segment.

11. The gas turbine engine of claim 10, wherein the slope of planar profile along the exit segment is zero.

12. The gas turbine engine of claim 7, wherein the exit segment is curved circumferentially relative to a portion of the tubular body immediately upstream of the exit segment.

13. A method of forming a diffuser pipe of a compressor with a center axis, the diffuser pipe including a generally radial portion, a bend portion and a generally axial portion having an exit segment that terminates at an outlet of the diffuser pipe, the method comprising:
positioning the bend portion of the diffuser pipe radially outwardly from the center axis and from the outlet of the diffuser pipe, orienting the exit segment of the diffuser pipe to be parallel with the center axis, all of the bend portion being radially further from the center axis than all of the exit segment, and curving a length of the axial portion of the diffuser pipe radially inwardly from the bend portion toward the exit segment, wherein an inner wall and an outer wall of the axial portion both curve radially inwardly from the bend portion toward the exit segment over the length of the generally axial portion.

14. The method of claim 13, wherein orienting the exit segment includes straightening the exit segment to have a same radial distance from the center axis over a length of the exit segment.

* * * * *